(12) United States Patent
Song

(10) Patent No.: US 7,428,625 B2
(45) Date of Patent: Sep. 23, 2008

(54) METHOD OF ADAPTIVELY CONTROLLING DATA ACCESS BY DATA STORAGE SYSTEM AND DISK DRIVE USING THE METHOD

(75) Inventor: Jae-ik Song, Gwonseon-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 470 days.

(21) Appl. No.: 11/055,168

(22) Filed: Feb. 11, 2005

(65) Prior Publication Data
US 2005/0182896 A1    Aug. 18, 2005

(30) Foreign Application Priority Data
Feb. 13, 2004    (KR) ...................... 10-2004-0009629

(51) Int. Cl.
    *G06F 12/00*    (2006.01)
(52) U.S. Cl. ...................... 711/171; 711/155
(58) Field of Classification Search ........................ None
    See application file for complete search history.

(56) References Cited

U.S. PATENT DOCUMENTS 5,742,934 A * 4/1998 Shinohara .................. 711/103

2002/0091902 A1    7/2002 Hirofuji
2004/0186958 A1 *  9/2004 Percival ...................... 711/129

FOREIGN PATENT DOCUMENTS

| JP | 2002-304302 | 10/2002 |
| JP | 2003-131944 | 5/2003 |
| KR | 1999-35425 | 5/1999 |
| KR | 2000-36131 | 6/2000 |

OTHER PUBLICATIONS

Korean Patent Application 10-1999-0035425 Application Translation. May 15, 1999.*
Korean Intellectual Property Office—Notice to Submit Response for corresponding Korean Application No. 10-2004-0009629.

* cited by examiner

*Primary Examiner*—Than Nguyen
(74) *Attorney, Agent, or Firm*—Staas & Halsey LLP

(57) ABSTRACT

A method of adaptively controlling data access by a data storage system, in which the sizes and the number of read/write caches are adjusted according to the size of a data access unit, and a disk drive using the method. The method of adaptively controlling read access by the data storage system includes determining whether a data read command is received from a host device, detecting the size of a data access unit from an input command pattern when the data read command is received, and adjusting the sizes of read segments to the detected size of the data access unit.

31 Claims, 4 Drawing Sheets

METHOD OF ADAPTIVELY CONTROLLING DATA ACCESS BY DATA STORAGE SYSTEM AND DISK DRIVE USING THE METHOD

CROSS-REFERENCE TO RELATED APPLICATIONS

This application claims the benefit of Korean Patent Application No. 2004-9629, filed on Feb. 13, 2004, in the Korean Intellectual Property Office, the disclosure of which is incorporated herein by reference.

BACKGROUND OF THE INVENTION

1. Field of the Invention

The present invention relates to a controlling method and a data storage device using the same, and more particularly, to a method of adaptively controlling data access by a data storage system, in which the sizes and the number of read/write caches are adjusted according to the size of a data access unit, and a disk drive using the method.

2. Description of the Related Art

Generally, a hard disk drive is a data storage device that reproduces data from disks or writes data onto the disks using magnetic heads. Hard disk drives have become widely used as recording mediums for audio/video (A/V) devices of multimedia systems.

A command pattern used for an A/V device is composed of data access units (DAUs) as illustrated in FIG. 3 and is equally applied to read/write commands. The basic access unit of a command generated by the A/V device is a host device, which is of a size of 512 KB, 1 MB, or 2 MB rather than a sector count. However, in a hard disk drive, data is processed using a command of 256 counts.

The hard disk drive divides data into small units before processing the data, thereby causing an overhead in executing the command. The overhead may lead to interruptions, e.g., moving images displayed or sounds played consecutively, depending on the operation of the A/V device.

SUMMARY OF THE INVENTION

Accordingly, it is an aspect of the present invention to provide a method of adaptively controlling data access by a data storage system by determining the size of a data access unit received from a host device and adjusting sizes and a number of read/write caches accordingly, and a disk drive using the method.

Additional aspects and/or advantages of the invention will be set forth in part in the description which follows and, in part, will be obvious from the description, or may be learned by practice of the invention.

The foregoing and/or other aspects of the present invention are achieved by providing a method of adaptively controlling read access by a data storage system. The method includes determining whether a data read command is received from a host device, detecting a size of a data access unit from an input command pattern when the data read command is received, and adjusting sizes of read segments to the detected size of the data access unit.

Another aspect of the present invention is achieved by providing a method of adaptively controlling write access by a data storage system. The method includes determining whether a data write command is received from a host device, detecting a size of a data access unit from an input command pattern when the data write command is received, and adjusting a size of a cache flush to a value obtained by dividing the detected size of the data access unit by a predetermined constant.

Another aspect of the present invention is achieved by providing a disk drive including a disk storing data, a host interface transmitting and receiving data to and from a host device, a cache memory storing data received from the host device via the host interface in a write mode and storing data read from the disk in a read mode, a controller detecting a size of a data access unit from a command pattern received from the host interface, adjusting a size of a read segment and a size of a cache flush of the cache memory according to the detected size of the data access unit, and reading the data from the disk according to the adjusted size of the read segment and storing the data in the cache memory or writing the data onto the disk according to the adjusted size of the cache flush, and a write/read circuit recording the data output from the cache memory onto the disk or reproducing the data from the disk.

BRIEF DESCRIPTION OF THE DRAWINGS

These and/or other aspects and advantages of the invention will become apparent and more readily appreciated from the following descriptions of the embodiments, taken in conjunction with the accompanying drawings of which.

DETAILED DESCRIPTION OF THE PREFERRED EMBODIMENTS

Figure 1:
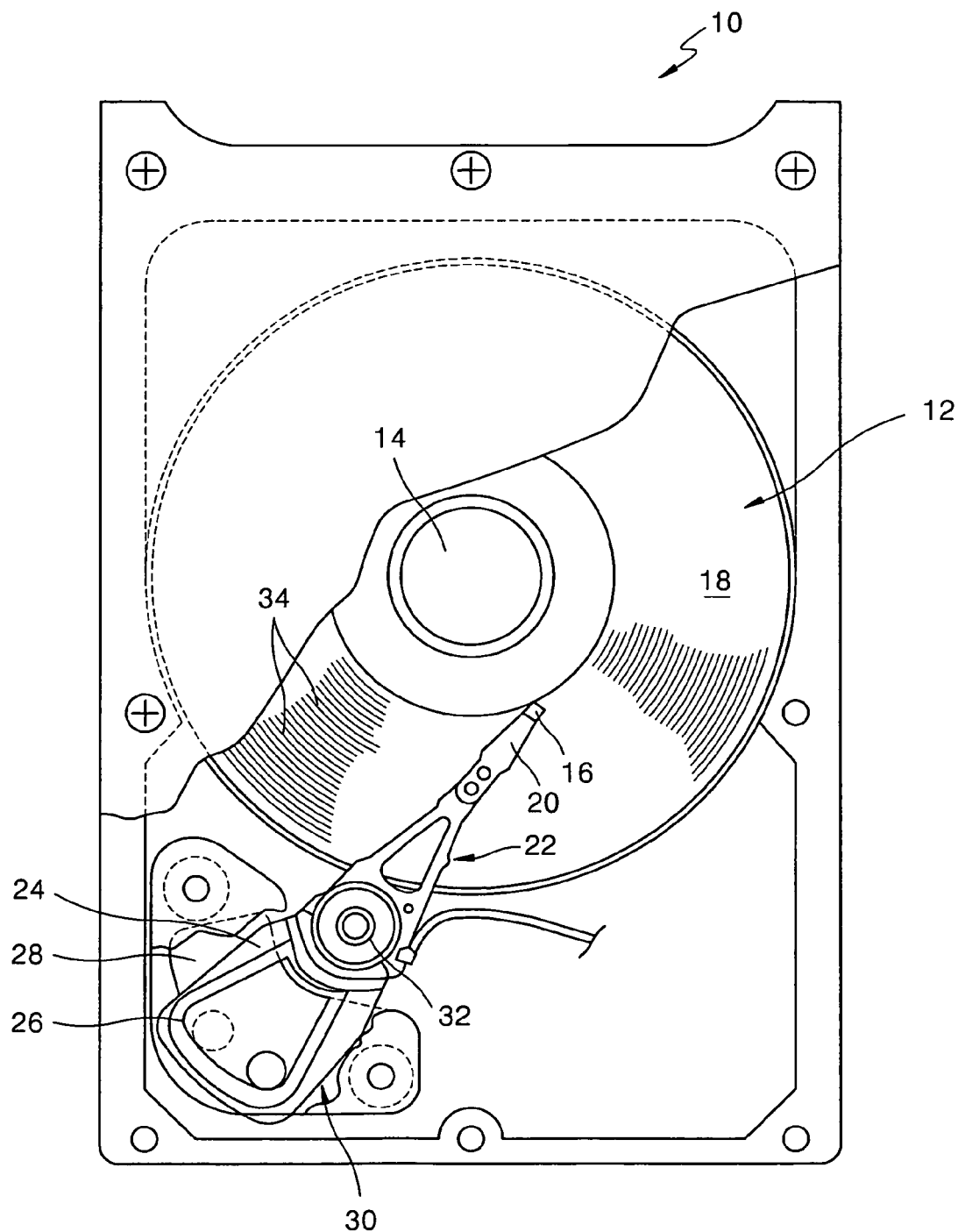
FIG. 1 is a top view of a disk drive according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a top view of a disk drive 10 according to an embodiment of the present invention. The disk drive 10 includes at least one magnetic disk 12 rotated by a spindle motor 14. The disk drive 10 also includes a transducer 16 adjacent to a surface 18 of the disk 12.

The transducer 16 writes or reads information to and from the disk 12 by sensing the magnetic field of the disk 12 or magnetizing the disk 12. Generally, the transducer 16 makes contact with the surface 18 of the disk 12. Although a single transducer is illustrated in FIG. 1, it should be understood that the transducer 16 may include a write transducer for magnetizing the disk 12 and a read transducer for sensing the magnetic field of the disk 12. The read transducer may be a magneto-resistive (MR) device. The transducer 16 is also referred to as a head.

The transducer 16 may be integrally formed with a slider 20. The slider 20 generates an air bearing between the transducer 16 and the surface 18 of the disk 12. The slider 20 is a part of a head gimbal assembly 22 that is attached to an actuator arm 24 which includes a voice coil 26. The voice coil 26 is adjacent to a magnetic assembly 28 to define a voice coil motor (VCM) 30. A current supplied to the voice coil 26 generates a torque that spins the actuator arm 24 around a bearing assembly 32. When the actuator arm 24 spins, the transducer 16 moves across the surface 18 of the disk 12.

Information is stored in annular tracks of the disk 12. Each of the tracks 34 includes a plurality of sectors, each having a data field and an identification field. The identification field is composed of gray codes identifying the sectors and the tracks (cylinders). The transducer 16 writes and reads information to and from other tracks by moving across the surface 18 of the disk 12.

Figure 2:
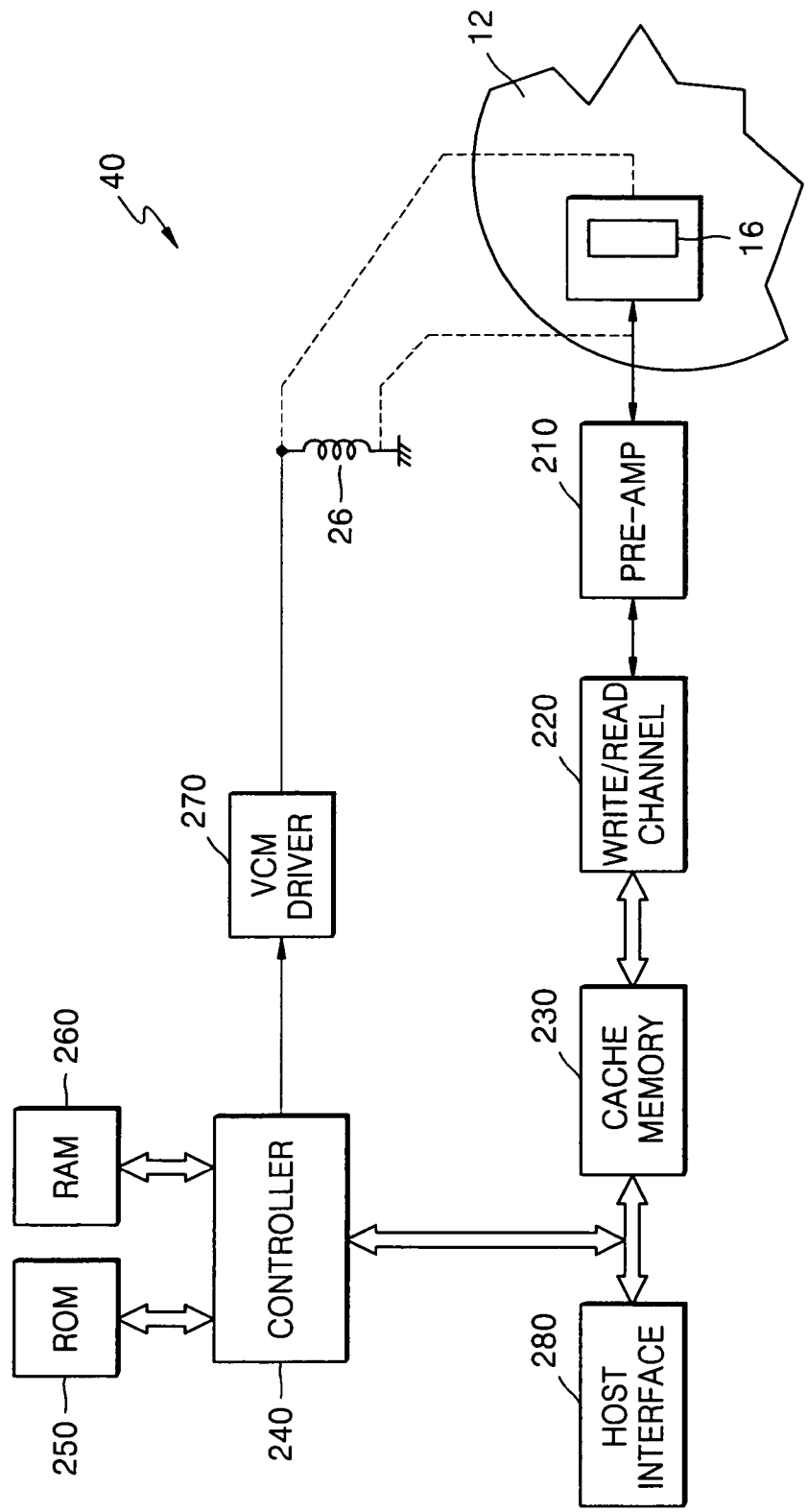
FIG. 2 is a circuit diagram of a disk drive using a method of adaptively controlling data access by a data storage system according to an embodiment of the present invention.

FIG. 2 is a circuit diagram of a disk drive according to an embodiment of the present invention. Referring to FIG. 2, the disk drive includes a disk 12, a transducer 16, a pre-amp 210, a write/read channel 220, a cache memory 230, a controller 240, a read-only memory (ROM) 250, a random access memory (RAM) 260, a voice coil motor (VCM) driver 270, and a host interface 280.

Hereinafter, a circuit including the free amp 210 and the write/read channel 220 is referred to as "a write/read circuit".

Several programs and data for controlling the disk drive are stored in the ROM 250. In particular, the ROM 250 stores programs and data for performing processes illustrated in FIGS. 4 and 5 according to embodiments of the present invention. However, data read from a maintenance area of the disk 12 and required for operating the disk drive 40 upon booting is loaded into the RAM 260.

The cache memory 230 acts as a data buffer for storing data received from a host device (not shown) via the host interface 280 in a write mode and data read from the disk 12 in a read mode.

The sizes of a read segment and a cache flush of the cache memory 230 are set to default values, and the default values are adaptively controlled according to the size of a data access unit (DAU) detected from a command pattern received from an audio/video (A/V) device (not shown).

Figure 3:
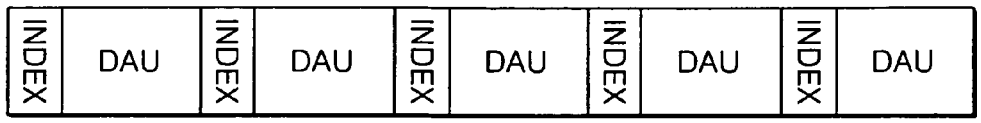
FIG. 3 illustrates a command pattern of an audio/video device.

FIG. 3 illustrates the command pattern received from the A/V device. Referring to FIG. 3, index data containing location information is interposed between the DAUs.

The operation of the disk drive will now be described. Referring to FIG. 2, in the data read mode, the disk drive 40 amplifies an analog signal sensed by the transducer 16 (i.e., a head) from the disk 12 according to the size of the read segment to enable signal processing afterwards. Then, the write/read channel 220 encodes the amplified analog signal into a digital signal readable by the host device and converts the digital signal into stream data. The cache memory 230 temporarily stores the stream data, which is then transmitted to the host device via the host interface 280.

In the data write mode, the disk drive 40 receives data from the host device via the host interface 280 and temporarily stores the data in the cache memory 230. The cache memory 230 outputs the data according to the size of the cache flush, and the write/read channel 220 converts the data into a binary data stream suitable for a write channel. The binary data stream is amplified by the pre-amp 210 and then written on the disk 12 by the transducer 16.

The controller 240 controls the overall operation of the disk drive 40. The controller 240 analyzes a command received via the host interface 280 and controls the disk drive 40 to execute the command. In particular, the controller 240 detects the size of the DAU from a command pattern received from the host device and adjusts the sizes of the read segment and the cache flush of the cache memory 230 according to the detected size of the DAU.

In addition, the controller 240 is connected to the VCM driver 270 supplying current to the voice coil 26. The controller 240 transmits a control signal to the VCM driver 270 to control the excitation of the VCM 30 (shown in FIG. 1) and the movement of the transducer 16.

An adaptive data access controlling method used in the hard disk drive controlled by the controller 240 will now be described.

Figure 4:
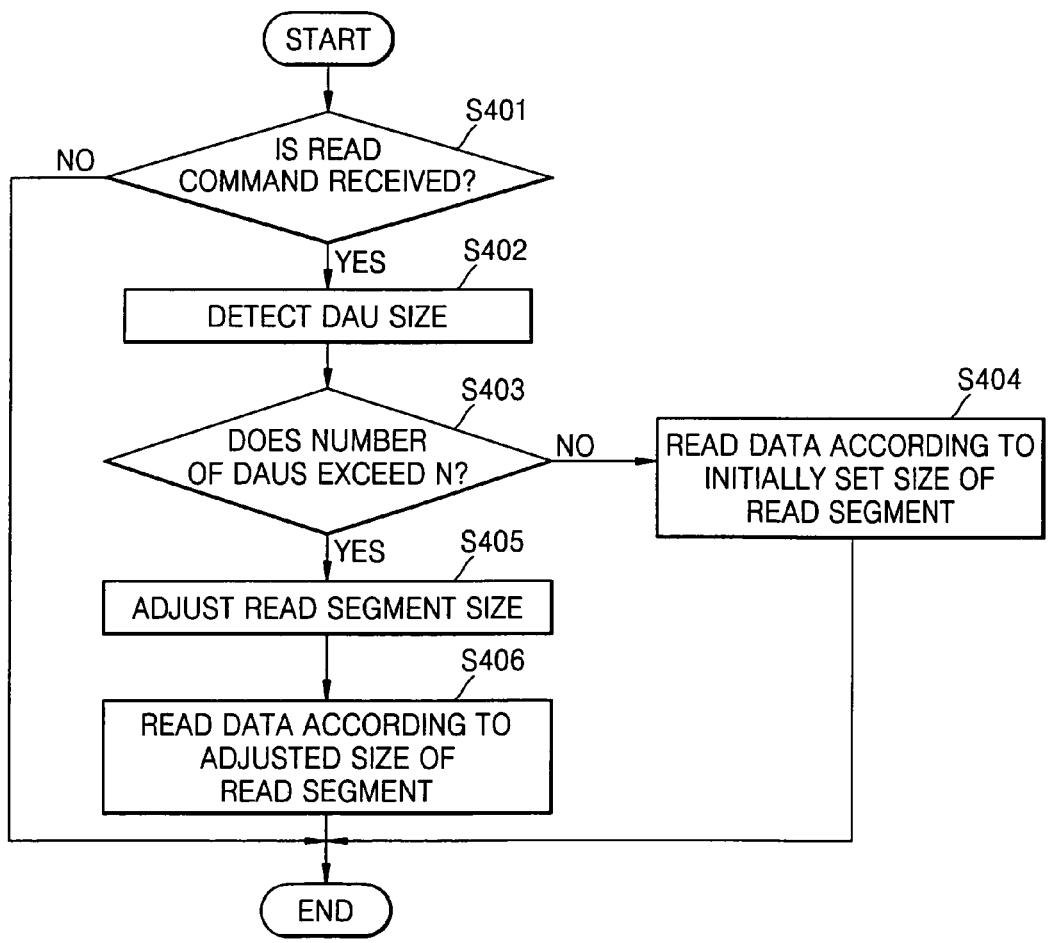
FIG. 4 is a flow chart illustrating a method of adaptively controlling data access by the data storage system in response to a read command according to an embodiment of the present invention.

FIG. 4 is a flow chart illustrating a method of adaptively controlling data read access according to an embodiment of the present invention. Referring to FIG. 4, in operation S401, the controller 240 determines whether a read command is received from the host device via the host interface 280.

When the read command is received in operation S401, the process moves to operation S402, where the controller 240 detects the size of a DAU from the read command pattern. While detecting the sizes of multiple DAUs received consecutively, it is also determined whether the sizes of the DAUs detected are identical. Generally, the sizes of DAUs received consecutively from a A/V device are identical.

Thereafter, from operation S402 the process moves to operation S403, where it is determined whether the number of DAUs received exceeds a predetermined 'N' number of DAUs, thereby determining a pattern of the DAUs so that the accuracy of determining the size of the DAU can be improved. The value of 'N' may be set to 100, for example.

When it is determined that the number of received DAUs does not exceed 'N' in operation S403, the process moves to operation S404, where data is read from the disk 12 according to an initial size of the read segment and stored in the cache memory 230. However, when it is determined that the number of DAUs received exceeds 'N' in operation S403, the process moves to operation S405, where the initial size of the read segment of the cache memory 230 is adjusted to the same size of the DAUs detected in operation S402.

The number of the read segments of the cache memory 230 is obtained by dividing the total size of a read cache by the detected size of the DAU. One of the read segments of the cache memory 230 is reserved for storing data on an index area.

From operation S405, the process moves to operation S406, where the data is sequentially read from the disk 12 according to the adjusted size of the read segment and stored in the cache memory 230. In this regard, the disk drive may pre-fetch the data according to the size of the DAU in the cache memory 230, thereby reducing disk access.

Figure 5:
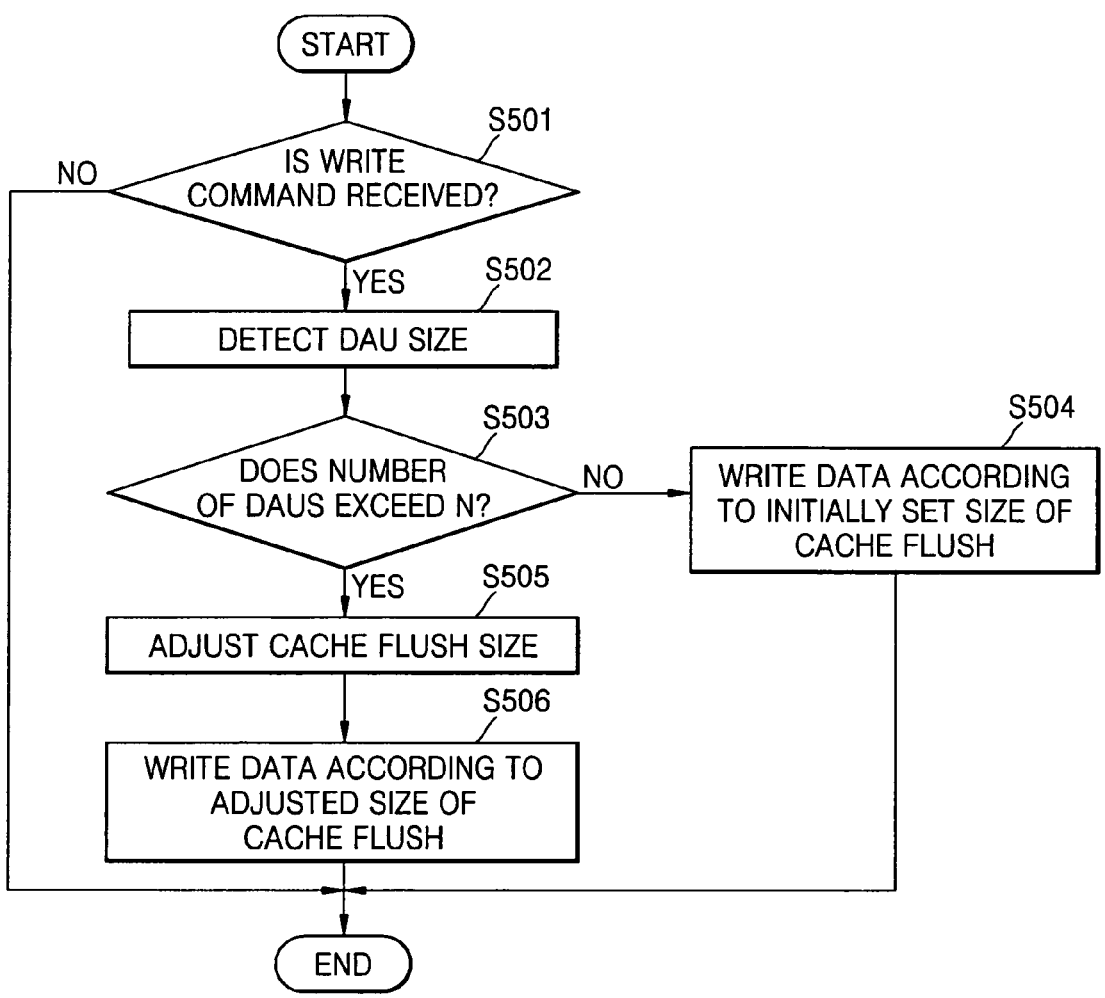
FIG. 5 is a flow chart illustrating a method of adaptively controlling data access by the data storage system in response to a write command according to an embodiment of the present invention.

FIG. 5 is a flow chart illustrating a method of adaptively controlling data write access according to an embodiment of the present invention. Referring to FIG. 5, in operation S501, the controller 240 determines whether a write command is received from the host device via the host interface 280.

When the write command is received in operation S501, the process then moves to operation S502, where the controller 240 detects the size of the DAU from the write command pattern. In operation S502, while detecting the sizes of multiple DAUs received consecutively, it is also determined whether the sizes of the DAUs detected are identical. Again, generally, the sizes of the DAUs received consecutively from the A/V device are identical.

From operation S502 the process moves to operation S503 where it is determined whether the number of DAUs received exceeds a predetermined 'N' number of DAUs, thereby determining a pattern of the DAUs so that the accuracy of determining the size of the DAU can be improved. The value of 'N' may be set to 100, for example.

When it is determined that the number of received DAUs does not exceed 'N' in operation S503, the process moves to operation S504, where data is output from the cache memory according to an initial size of the cache flush and written onto the disk.

However, when it is determined that the number of received DAUs exceeds 'N' in operation S503, the process moves to operation S505, where the initial size of the cache flush of the cache memory 230 is adjusted to a value obtained by dividing the size of the DAUs detected in operation S502 by a constant. The constant may be, for example, one or two. According to the constant, the size of the cache flush may be adjusted to be the same as or half of the detected size of the DAU.

From operation S505 the process moves to operation S506, where the data is sequentially output from the cache memory 230 according to the size of the cache flush adjusted in operation S505 and written onto the disk 12.

By limiting the size of the cache flush to half the size of the DAU or to the same size of the DAU in the data write mode, this eliminates the need to execute multiple disk drive commands for one data access from the host device.

As described above, embodiments of the present invention adaptively control the size of a read segment and the size of a cache flush according to the size of a DAU received from a host device, thereby reducing the frequency of disk access in a disk drive. In particular, interruptions to audio/video data consecutively played or displayed can be minimized.

The present invention may be implemented as a method, an apparatus, and a system. Embodiments of the present invention may also be implemented as software including code segments necessary for performing the methods illustrated in FIGS. 4 and 5, for example. Programs or code segments may be stored in processor-readable mediums or transmitted in response to a computer data signal coupled with a carrier wave in a transmission medium or on a communications network.

The processor-readable mediums may include any medium capable of storing or transmitting information. The data processor-readable mediums may include an electric circuit, a semiconductor memory device, a ROM, a flash memory, an erasable ROM, a floppy disk, an optical disk, a hard disk, an optic fibre medium, and a radio frequency (RF) network.

The computer data signal may be any signal that can be transmitted over a transmission medium such as an electric network channel, an optical fiber, air, an electric field, and an RF network.

The present invention may be applied not only to a variety of disk drives such as a hard disk drive but also to various kinds of data storage devices.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of adaptively controlling read access by a data storage system, the method comprising:
   determining whether a data read command is received from a host device;
   detecting a size of a data access unit from an input command pattern when the data read command is received;
   adjusting sizes of read segments to the detected size of the data access unit; and
   reading data according to the adjusted sizes of the read segments.

2. The method of claim 1, wherein the size of the data access unit is determined by detecting sizes of a plurality of data access units input consecutively.

3. The method of claim 1, wherein the host device comprises an audio/video device.

4. The method of claim 1, wherein a number of the read segments is determined by dividing a total size of a read cache by the size of the data access unit.

5. The method of claim 1, wherein one of the read segments is reserved for storing data on an index area of the input command pattern.

6. The method of claim 2, further comprising determining whether the sizes of the data access units are identical.

7. The method of claim 2, further comprising determining whether an input of the data access units exceeds a predetermined number of data access units, thereby determining a pattern of the data access units.

8. The method of claim 7, wherein when it is determined that the input of the data access units does not exceed the predetermined number of data access units, data is read from a disk according to an initial size of a read segment stored in a cache memory; and
   when it is determined that the input of the data access units exceeds the predetermined number of data access units, the initial size of the read segment of the cache memory is adjusted to a size same as the detected data access unit.

9. A method of adaptively controlling write access by a data storage system, the method comprising:
   determining whether a data write command is received from a host device;
   detecting a size of a data access unit from an input command pattern when the data write command is received;
   adjusting a size of a cache flush to a value obtained by dividing the detected size of the data access unit by a predetermined constant; and
   outputting data from a cache memory according to the adjusted size of the cache flush.

10. The method of claim 9, wherein the size of the data access unit is determined by detecting sizes of a plurality of data access units input consecutively.

11. The method of claim 9, wherein the predetermined constant is one.

12. The method of claim 9, wherein the predetermined constant is two.

13. The method of claim 9, wherein the host device comprises an audio/video device.

14. The method of claim 10, further comprising determining whether the sizes of the data access units are identical.

15. The method of claim 10, further comprising determining whether an input of the data access units exceeds a predetermined number of data access units, thereby determining a pattern of the data access units.

16. The method of claim 15, wherein when it is determined that the input of the data access units does not exceed the predetermined number of data access units, data is output from a cache memory according to an initial size of the cache flush and written onto a disk; and
   when it is determined that the input of the data access units exceeds the predetermined number of data access units, the initial size of the cache flush of the cache memory is adjusted to a value obtained by dividing the sizes of the data access units detected by the predetermined constant.

17. A disk drive comprising:
   a disk storing data;

a host interface transmitting and receiving data to and from a host device;

a cache memory storing data received from the host device via the host interface in a write mode and storing data read from the disk in a read mode;

a controller detecting a size of a data access unit from a command pattern received from the host interface, adjusting a size of a read segment and a size of a cache flush of the cache memory according to the detected size of the data access unit, and reading data from the disk according to the adjusted size of the read segment and storing the read data in the cache memory or writing the read data onto the disk according to the adjusted size of the cache flush; and a write/read circuit recording the read data output from the cache memory onto the disk or reproducing the data from the disk.

18. The disk drive of claim 17, wherein the size of the data access unit is determined by detecting sizes of a plurality of data access units input consecutively.

19. The disk drive of claim 17, wherein the size of the read segment is adjusted to the detected size of the data access unit.

20. The disk drive of claim 17, wherein the host device comprises an audio/video device.

21. The disk drive of claim 17, wherein a number of the read segments is determined by dividing a total size of a read cache of the cache memory by the size of the data access unit.

22. The disk drive of claim 21, wherein one of the read segments is reserved for storing data on an index area of the command pattern.

23. The disk drive of claim 17, wherein the size of the cache flush is adjusted to a value obtained by dividing the detected size of the data access unit by a predetermined constant.

24. The disk drive of claim 23, wherein the predetermined constant is one.

25. The disk drive of claim 23, wherein the predetermined constant is two.

26. The disk drive of claim 17, wherein the sizes of the read segment and the cache flush of the cache memory are set to default values adaptively controlled according to the detected size of the data access unit.

27. A computer readable medium encoded with processing instructions for implementing a method of adaptively controlling read access by a data storage system, the method comprising:

determining whether a data read command is received from a host device;

detecting a size of a data access unit from an input command pattern when the data read command is received;

adjusting sizes of read segments to the detected size of the data access unit; and reading data according to the adjusted sizes of the read segments.

28. The computer readable medium of claim 27, wherein the size of the data access unit is determined by detecting sizes of a plurality of data access units input consecutively.

29. The computer readable medium of claim 27, wherein a number of the read segments is determined by dividing a total size of a read cache by the size of the data access unit.

30. A computer readable medium encoded with processing instructions for implementing a method adaptively controlling write access by a data storage system, the method comprising:

determining whether a data write command is received from a host device;

detecting a size of a data access unit from an input command pattern when the data write command is received;

adjusting a size of a cache flush to a value obtained by dividing the detected size of the data access unit by a predetermined constant; and outputting data from a cache memory according to the adjusted size of the cache flush.

31. The computer readable medium of claim 30, wherein the size of the data access unit is determined by detecting sizes of a plurality of data access units input consecutively.

* * * * *